UNITED STATES PATENT OFFICE.

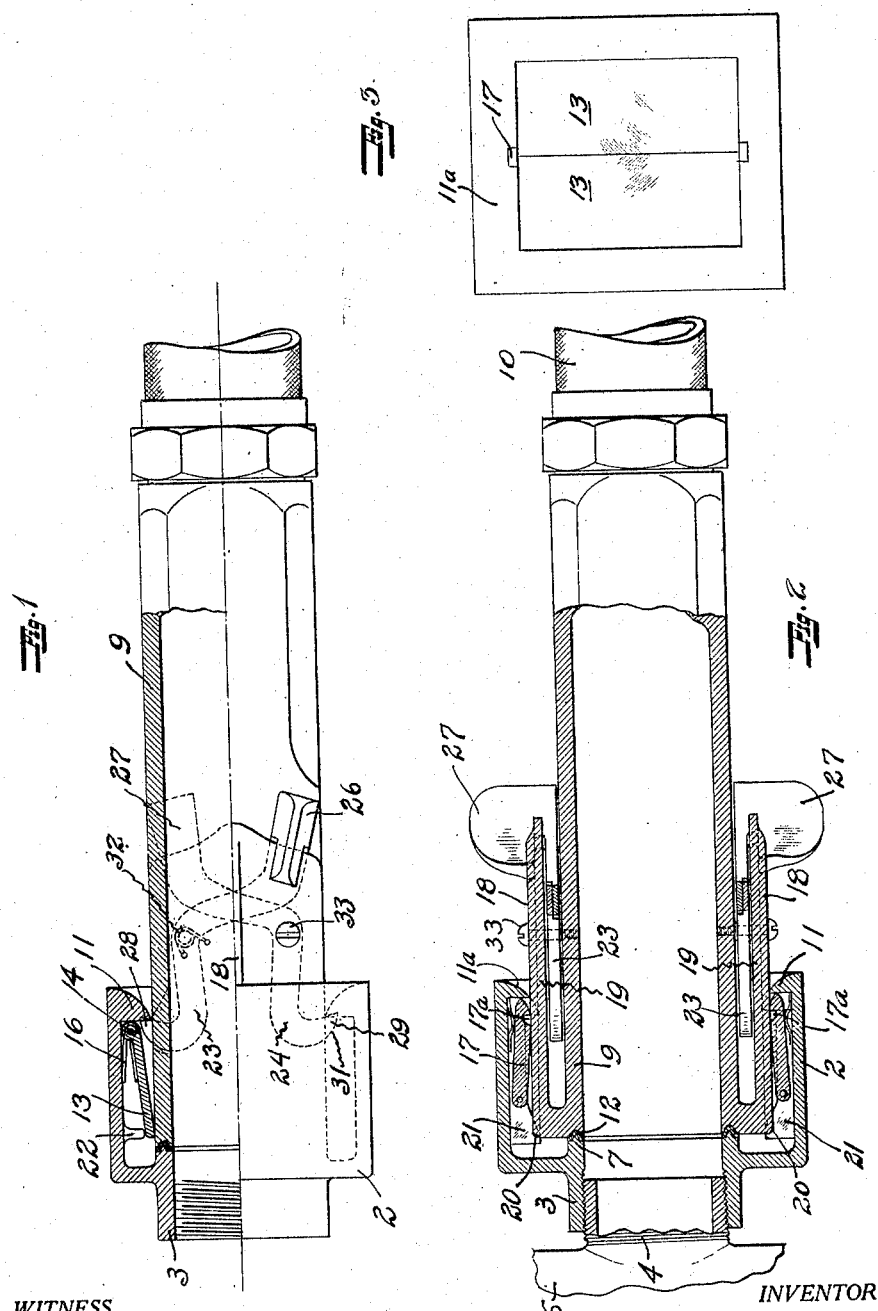

FERDINANDO ANTONIETTI, OF SAN FRANCISCO, CALIFORNIA.

COUPLING.

1,303,448.   Specification of Letters Patent.   Patented May 13, 1919.

Application filed March 7, 1918. Serial No. 220,904.

*To all whom it may concern:*

Be it known that I, FERDINANDO ANTONIETTI, a citizen of Switzerland, and a resident of the city and county of San Francisco and State of California, have invented a new and useful Coupling, of which the following is a specification.

My invention relates to hose couplings, and particularly to those suitable for coupling a hose to a fire hydrant.

An object of the invention is to provide a coupling which can be connected or disconnected very quickly.

Another object of the invention is to provide a coupling which is connected or disconnected with the hands only.

The invention possesses other features of advantage, some of which, with the foregoing, will be set forth in the following description of the preferred form of my invention which is illustrated in the drawings accompanying and forming part of the specification. It is to be understood that I do not limit myself to the showing made by the said drawings and description, as I may adopt variations of the preferred form within the scope of my invention as set forth in the claims.

Referring to the drawings:

Figure 1 is a half sectional view taken in a horizontal plane.

Fig. 2 is a side elevation, part of the structure being broken away.

Fig. 3 is a front elevation of the housing before the insertion of the plug nozzle.

My invention comprises a housing 2 which is permanently attached by means of the threaded annular flange 3 to the nipple 4 of the fire hydrant 6. The annular flange 3 extends into the housing and terminates therein in an annular seat 7. The flange 3 thus forms an extension of the hydrant nipple 4 and terminates in the seat 7, against which the end of the plug nozzle 9 of the hose 10 abuts. Opposite the annular seat, the housing 2 is provided with a rectangular opening, the wall on that side, forming only a narrow flange 11 adapted to snugly surround the square body of the plug nozzle. The outside surface 11ª of the flange 11 is beveled to facilitate the entrance of the plug nozzle, and the end of the latter is preferably provided with a gasket 12 formed complementary to the seat 7, and adapted to permit a tight joint to be formed between the parts when the plug nozzle is pushed into the housing and up against the seat.

Means are provided for closing the opening in the housing when the plug nozzle is withdrawn. On each side of the opening behind the flange 11, a door 13 wide enough to close half the opening, is pivoted on the pin 14, and a spring 16 tends to keep the doors closed. In order to prevent wanton and unnecessary opening of the doors, spring-pressed latches 17 are provided at top and bottom which lock the doors in the closed position by engaging them in notches 17ª therein. These latches are arranged to be released automatically when the plug nozzle is pushed against the doors. The end of each latch is finished flush with the surface 11ª of the flange 11, and a ridge 18 is disposed upon the top and bottom plates 19 of the plug nozzle, the ends 20 of the ridges, engaging and throwing back the latches with the initial entering movement of the plug nozzle. The instant the notches 17ª disengage from the doors, the end of the entering nozzle forces back the two doors, the latches 17 bearing upon the ridges 18 as the plug nozzle is pushed to its seat.

In order to insure instant and exact alinement of the plug nozzle with the flange 3, inclined ridges 21 are disposed at the top and bottom of the housing. Lugs 22 are disposed on each side to limit the backward swinging of the doors 13. As the plug nozzle approaches its seat, the doors 13 on the sides and the ridges 21 at top and bottom, accurately guide the end of the nozzle and prevent lateral displacement thereof on the seat 7.

Means are provided for retaining the nozzle 9 within the housing and upon the seat 7 so that a continuous and tight conduit is formed, and this is accomplished by arranging latches upon the plug nozzle, which automatically engage the housing when the nozzle is thrust in, and which are manually released so that the nozzle may be withdrawn. On both the top and bottom of the plug nozzle, a pair of latch levers 23 and 24 are pivoted below the plates 19. The levers cross each other, so that by pressing the adjacent wings 26 and 27 respectively, together, the hooked ends 28 and 29 respectively, which project from the sides of the nozzle, are withdrawn from their seats formed on the inside of the flange 11. The front edges 31 of the latch levers are beveled so that they offer no resistance to the entrance of the plug nozzle into the housing, and a spring 32 on each lever tends to keep the hooked ends 28 and 29 extended. The pivot upon which each latch lever is mounted is preferably the smooth shank of a cap screw 33, which also serves to secure the plate in place.

Operation.

When it is desired to connect the hose 10 to the hydrant 6, the plug nozzle is merely thrust within the flange 11 and against the doors 13. The ends of the ridges 18 release the latches 17, which permits the doors to swing back before the entering plug nozzle. As the end of the nozzle seats against the annular seat 7, the latch levers snap into hooked engagement with the inside of the flange 11 and securely retain the nozzle upon its seat. The water in the hydrant is then turned on in the usual way. After turning off the water, the plug nozzle is detached by pressing the wings 26 and 27 of the latch levers together with the two hands. With the release of the hooked ends 28 and 29 of the levers from their seats in the flange 11, the plug nozzle may be pulled out of the housing, the doors swinging shut after it, and the latches 17 snapping back into place to retain the doors in the closed position.

If desired, the housing 2, may be formed directly upon the nipple 4 of the hydrant; that is to say, it may be formed integrally with the hydrant structure instead of as an attachment, the seat 7 then being on the end of the nipple.

I claim:

1. In combination with a hydrant, a nipple terminating in a seat, a laterally closed housing surrounding said seat and rigidly fixed thereto, and a plug nozzle adapted to be inserted in said housing and to abut against said seat.

2. In combination with a hydrant, a nipple terminating in a seat, a housing laterally surrounding said seat and rigidly fixed thereto, a plug nozzle adapted to be inserted in said housing and to abut against said seat, and means for retaining said nozzle on said seat.

3. In combination with a hydrant, a nipple terminating in a seat, a housing surrounding said seat and rigidly fixed thereto, a plug nozzle adapted to be inserted in said housing and to abut against said seat, and means automatically engageable and manually releasable for retaining said nozzle on said seat.

4. In combination with a hydrant, a nipple terminating in an annular seat, a housing surrounding said seat and provided with an aperture, a plug nozzle adapted to be inserted in said housing through said aperture to engage said seat, and automatically operating means for closing said aperture when said nozzle is withdrawn.

5. In combination with a hydrant, a housing attached thereto and having a passage connecting said housing to said hydrant, a seat in said housing surrounding the end of said passage, a plug nozzle adapted to be inserted in said housing to engage said seat, and means for retaining said nozzle on said seat.

6. In combination with a hydrant, a nipple terminating in a seat, a housing surrounding said seat and provided with an aperture in the wall opposite said seat, a plug nozzle adapted to be inserted in said housing through said aperture to engage said seat, and latch levers for engaging said housing to retain said plug nozzle on said seat.

7. In combination with a hydrant, a nipple terminating in a seat, a housing surrounding said seat and provided with an aperture in the wall opposite said seat, a plug nozzle adapted to be inserted in said housing through said aperture to engage said seat, and latch levers on said nozzle automatically engaging the edges of said apertured wall for retaining said plug nozzle on said seat.

8. In combination with a hydrant, a nipple terminating in a seat, a housing surrounding said seat and provided with an aperture, a plug nozzle adapted to be inserted through said aperture to engage said seat, and doors normally closing said aperture and adapted to be opened by the entering end of said plug nozzle.

9. In combination with a hydrant, a nipple terminating in a seat, a housing surrounding said seat and provided with an aperture, a plug nozzle adapted to be inserted through said aperture to engage said seat, doors for closing said aperture, latches for locking said doors in the closed position, and means on said plug nozzle for automatically releasing said latches to permit said doors to open when said plug nozzle is thrust through said aperture.

10. In combination with a hydrant, a nipple terminating in a seat, a housing surrounding said seat and provided with an aperture, a plug nozzle adapted to be inserted through said aperture to engage said seat, a door pivotally mounted on each side of said aperture to normally close the same, spring-pressed latches engaging both doors at the top and bottom thereof for retaining the doors in the closed position, and a ridge on the top and bottom of said nozzle for releasing said latches to permit the doors to open when said nozzle is thrust through said aperture.

11. In combination with a hydrant, a nipple terminating in a seat, a housing surrounding said seat and provided with an aperture, a plug nozzle adapted to be inserted through said aperture to engage said seat, doors for closing said aperture, latches for locking said doors in the closed position, means on said plug nozzle for automatically releasing said latches to permit said doors to open when said plug nozzle is thrust through said aperture, and means for retaining said plug nozzle in said housing in engagement with said seat.

12. In combination with a hydrant, a nipple terminating in a seat, a housing surrounding said seat and provided with an aperture, a plug nozzle adapted to be inserted through said aperture to engage said seat, doors for closing said aperture, latches for locking said doors in the closed position, means on said plug nozzle for automatically releasing said latches to permit said doors to open when said plug nozzle is thrust through said aperture, and automatically engageable, manually releasable latches for retaining said plug nozzle in said housing in engagement with said seat.

13. In combination with a hydrant, a nipple terminating in a seat, a housing surrounding said seat and provided with an aperture, a plug nozzle adapted to be inserted through said aperture to engage said seat, doors normally closing said aperture and adapted to be opened by the entering end of said plug nozzle, and means for limiting the movement of said doors whereby they guide said nozzle to said seat.

14. In combination with a hydrant, a nipple terminating in a seat, a housing surrounding said seat and provided with an aperture, a plug nozzle adapted to be inserted through said aperture to engage said seat, doors normally closing said aperture and adapted to be opened by the entering end of said plug nozzle, and means including said opened doors for guiding said plug nozzle into alinement with said seat.

15. In combination with a hydrant, a nipple terminating in a seat, a housing surrounding said seat and provided with an aperture, a plug nozzle adapted to be inserted through said aperture to engage said seat, doors normally closing said aperture and adapted to be opened by the entering end of said plug nozzle, means including said opened doors for guiding said plug nozzle into alinement with said seat, and means for retaining said plug nozzle upon said seat.

In testimony whereof, I have hereunto set my hand at San Francisco, California, this 1st day of March 1918.

FERDINANDO ANTONIETTI.

In presence of—
H. G. PROST.

Copies of this patent may be obtained for five cents each, by addressing the "Commissioner of Patents, Washington, D. C."